United States Patent [19]

Murakami et al.

[11] Patent Number: 5,043,649

[45] Date of Patent: Aug. 27, 1991

[54] STEPPING MOTOR UNIT AND ROTARY CONTROL VALVE INCORPORATING THE SAME

[75] Inventors: Fumiaki Murakami; Masahiko Suzuki; Masatoshi Kuroyanagi; Jirou Asai; Yoshimi Natsume; Akira Takagi, all of Aichi; Kiyomitsu Kozawa, Nagoya, all of Japan

[73] Assignee: Nippondenso Co., Ltd., Kariya, Japan

[21] Appl. No.: 456,781

[22] Filed: Dec. 28, 1989

[30] Foreign Application Priority Data

Dec. 28, 1988 [JP] Japan .................. 63-334012
Nov. 2, 1989 [JP] Japan .................. 1-286074
Nov. 4, 1989 [JP] Japan .................. 1-287673

[51] Int. Cl.$^5$ ............................................ H02P 8/00
[52] U.S. Cl. .................................... 318/696; 318/685; 318/473; 188/299; 267/64.15; 361/25
[58] Field of Search .................. 318/696, 685, 473; 188/299; 267/64.15; 361/23-25

[56] References Cited

U.S. PATENT DOCUMENTS

| | | | |
|---|---|---|---|
| 4,053,196 | 10/1977 | Dunaway | 361/23 X |
| 4,320,431 | 3/1982 | Bell | 361/23 |
| 4,721,894 | 1/1988 | Graber | 318/473 |
| 4,813,519 | 3/1989 | Matsubara et al. | 188/299 |
| 4,926,077 | 5/1990 | Gauthier et al. | 318/696 X |

Primary Examiner—William M. Shoop, Jr.
Assistant Examiner—Saul M. Bergmann
Attorney, Agent, or Firm—Cushman, Darby & Cushman

[57] ABSTRACT

A stepping motor unit includes a stepping motor of the type wherein the interior of the stepping motor is filled with an oil, a detector for detecting the temperature of the oil in the stepping motor, a device for varying an upper limiting value of the rotational speed of the stepping motor and an upper limiting value of the rotational acceleration of the stepping motor in view of a current viscous condition of the oil based on the temperature detected by the temperature detector, and a driver for driving the stepping motor at a rotational speed and a rotational acceleration which fall in ranges, respectively, not exceeding the upper limiting values. The stepping motor unit thus constructed has rapid and accurate response characteristics and is capable of operating reliably without falling out of step even when the environmental temperature varies in a very wide range. A rotary control valve incorporating such stepping motor unit is also disclosed.

25 Claims, 12 Drawing Sheets

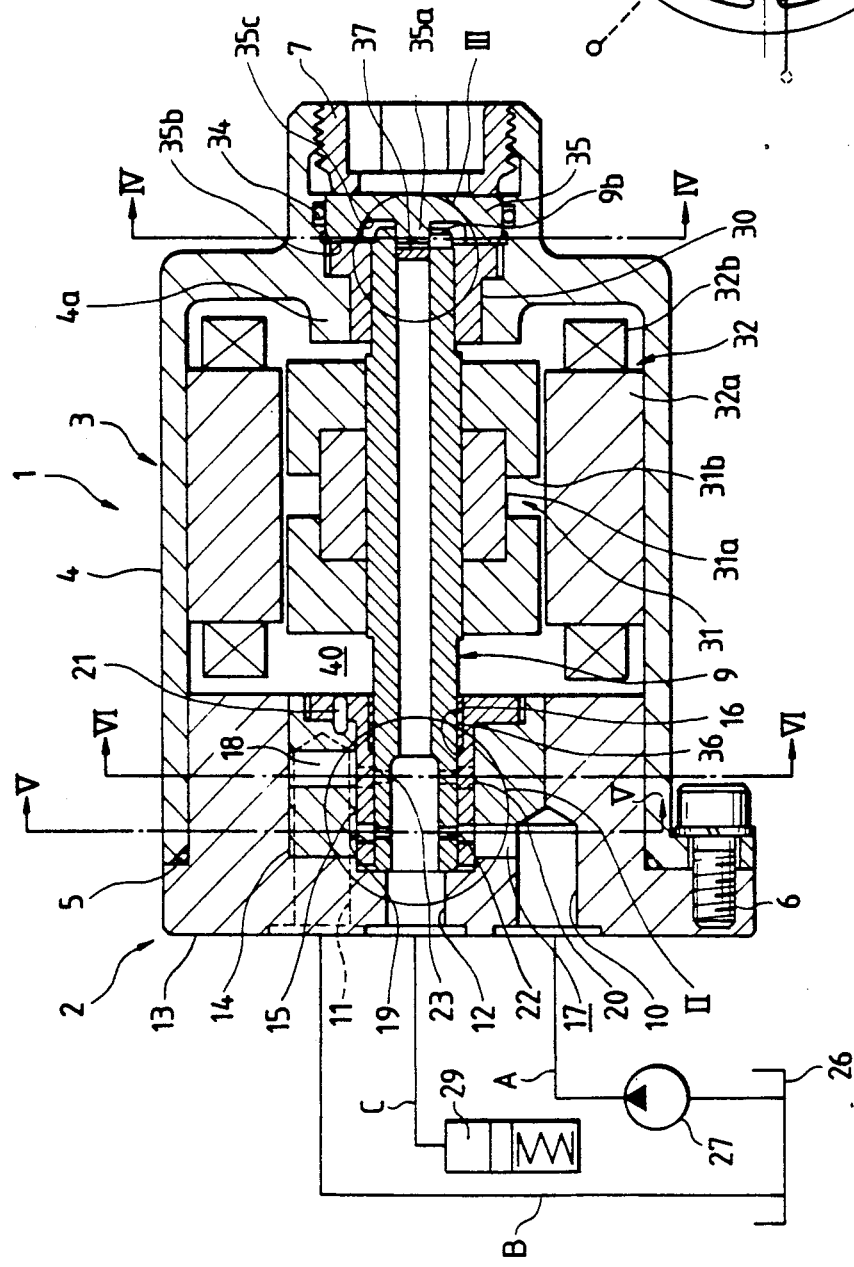
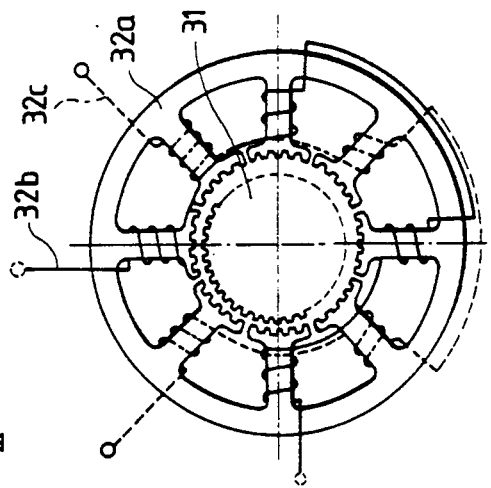
FIG. 1(a)
FIG. 1(b)

STEPPING MOTOR UNIT AND ROTARY CONTROL VALVE INCORPORATING THE SAME

BACKGROUND OF THE INVENTION

1. Field of the Invention

The present invention relates to a stepping motor unit of the type wherein the internal space of a stepping motor is filled with an oil such as a silicone oil so as to prevent the stepping motor from falling out of step and generating undue heat. It also relates to a rotary control valve incorporating such stepping motor unit.

2. Description of the Prior Art

It is known that out-of-step and abnormal heating of the stepping motor can be substantially avoided by filling the internal space of a stepping motor with a silicone oil or the like.

The silicone oil thus filled in the internal space of the stepping motor is effective to lower or dampen the inertia of a rotor when the stepping motor is coming to a stop after completing a step or slew motion. Thus, out-of-step of the motor resulting from overshoot is prevented to a certain extent. Furthermore, the silicone oil is also effective to prevent abnormal heating which would otherwise occur in a stator winding of the motor. Consequently, the continuous service time period and the service life of the stepping motor are substantially extended.

One such known stepping motor is disclosed in Japanese Utility Model Laid-open Publication No. 59—177876 in which the stepping motor is combined with a control valve unit to jointly constitute a motor-operated flow control valve for controlling the rate of flow of a hydraulic oil which also fills the internal space of a housing in which the stepping motor and the control valve unit are sealingly received.

When the motor-operated flow control valve is used in an automobile or the like application in which the environmental temperature varies widely, the foregoing out-of-step protection is difficult to achieve because the viscous condition of the hydraulic oil in the motor varies with the environmental temperature. For instance, when the environmental temperature is very low, the viscosity of the working fluid is considerably high with the result that only an insufficient motor torque is produced. Conversely, when the environmental temperature is very high, the viscosity of the hydraulic oil has a very low and hence has an insufficient inertia damping effect which allows the stepping motor to fall out of step.

SUMMARY OF THE INVENTION

With the foregoing drawbacks of the prior art in view, it is an object of the present invention to provide a stepping motor unit which has rapid and accurate response characteristics and is capable of operating reliably without falling out of step even when the environmental temperature varies in a very wide range.

Another object of the present invention is to provide a rotary control valve incorporating such stepping motor unit and capable of controlling the flow rate of a hydraulic oil accurately without being affected very much by fluid energy.

According to a first aspect of the present invention, there is provided a stepping motor unit comprising: a stepping motor; a housing sealingly holding therein the stepping motor and filled with an oil; means for detecting the temperature of the oil within the housing; means for varying an upper limiting value of the rotational speed of the stepping motor and an upper limiting value of the rotational acceleration of the stepping motor in view of a current viscous condition of the oil based on the temperature detected by the temperature detecting means; and means for driving the stepping motor at a rotational speed and a rotational acceleration which fall in ranges, respectively, not exceeding the upper limiting values.

The stepping motor is composed of a rotor mounted on a rotating shaft and a stator disposed in confrontation to the rotor, the stator including a stator core formed of a ferromagnetic substance and stator coils wound around the ferromagnetic stator core. The temperature detecting means comprises means for detecting resistance values of the respective stator coils as a temperature of the oil.

According to a second aspect of the present invention, there is provided a stepping motor unit comprising a stepping motor composed of a rotor mounted on a rotating shaft and a stator disposed in confrontation to the rotor, the stator including a stator core formed of a ferromagnetic substance and stator coils wound around the ferromagnetic stator core, a housing sealingly holding therein the stepping motor and filled with an oil; means for detecting the temperature of the oil within the housing; means for controlling exciting current values to be supplied to the stator coils in such a manner that as the temperature of oil decreases, the exciting current values increase; and means for driving the stepping motor by exciting the stator coils at the controlled current values.

According to a third aspect of the present invention, there is provided a motor-operated rotary control valve comprising: a rotary valve unit having first and second ports adapted to be connected to an external oil hydraulic line, and a shaft disposed in a flow path communicating the first and second ports, the shaft being rotatable to change the flow rate of a hydraulic oil flowing through the flow path; a stepping motor having a rotating shaft constituted by the shaft of the rotary control valve unit; a housing sealingly holding a therein the rotary control valve unit and the stepping motor and filled with the hydraulic oil; means for detecting the temperature of the hydraulic oil within the housing; means for varying an upper limiting value of the rotational speed of the stepping motor and an upper limiting value of the rotational acceleration of the stepping motor in view of a current viscous condition of the hydraulic oil based on the temperature detected by the temperature detecting means; and means for driving the stepping motor at a rotational speed and a rotational acceleration which fall in ranges, respectively, not exceeding the upper limiting values.

The shaft has a hollow internal space extending longitudinally throughout the length thereof, at least one end portion and the opposite end portion of the shaft having a hollow cylindrical shape. The one hollow cylindrical end portion has an orifice extending radially across the thickness of the one hollow cylindrical end portion and communicating the outside and the inside of the one hollow cylindrical end portion. The housing includes first and second bearing portions rotatably retaining the end portions, respectively, of the shaft, the first bearing portion having an opening adapted to be communicated with the orifice when the shaft rotates. The first and second ports are formed in the housing and communicating with the opening in the first bearing portion and the inside of the one hollow cylindrical end portion, respectively.

The one hollow cylindrical end portion may have a second orifice extending radially across the thickness of the one hollow cylindrical end portion and communicating the outside and the inside of the one hollow cylindrical end portion. In this instance, the first bearing portion has a second opening adapted to be communicated with the second orifice when the shaft rotates, and the housing further has a third port communicating with the second opening and adapted to be connected with the external oil hydraulic line.

The one hollow cylindrical end portion of the shaft and the first bearing portion jointly define therebetween a first annular space, the first annular space communicating with the second port. The opposite hollow cylindrical end portion of the shaft and the second bearing portion jointly define therebetween a second annular space, the second annular space communicating with the second port via the hollow interior space in the shaft including the inside of the one hollow cylindrical end portion of the shaft. Thus, a part of the hydraulic oil flowing through the flow path is permitted to flow into the first and second annular spaces via the second port.

The opposite hollow cylindrical end portion of the shaft may have in its outer peripheral surface an annular groove opening to the second annular space, and a radial through-hole extending diametrically across the opposite hollow cylindrical end portion and communicating at opposite ends to the annular groove. Thus, a hydrostatic bearing is provided.

According to a preferred embodiment, the orifice has a substantially isosceles triangular shape and is disposed such that the vertex and the base of the isosceles triangular orifice are spaced from one another in the circumferential direction of the shaft with its imaginary perpendicular lying in a plane extending perpendicular to the axis of the shaft. The radial opening in the first bearing portion has a substantially rectangular shape and is disposed such that parallel spaced longer sides of the rectangular radial opening extend in the circumferential direction of the shaft. A wedge-shaped notch extends contiguously from the vertex of the isosceles triangular orifice, the wedge-shaped notch having a depth smaller than the thickness of the one hollow cylindrical end portion of the shaft and progressively decreasing in a direction away from the vertex of the isosceles triangular orifice. Preferably, an extent of the isosceles triangular orifice in the axial direction of the shaft is slightly smaller than the length of shorter sides of the rectangular radial opening, and a combined length of the isosceles triangular orifice and the wedge-shaped notch in the circumferential direction of the shaft is slightly larger than the length of the longer sides of the rectangular radial opening.

The above and other objects, features and advantages of the present invention will become more apparent from the following description when making reference to the detailed description and the accompanying sheets of drawings in which preferred structural embodiments incorporating the principles of the present invention are shown by way of illustrative example.

BRIEF DESCRIPTION OF THE DRAWINGS

FIG. 1(a) is a longitudinal cross-sectional view of a rotary control valve incorporating a stepping motor unit according to the present invention;

FIG. 1(b) is a diagrammatical view showing the construction of the stepping motor of the rotary control valve;

DETAILED DESCRIPTION OF THE PREFERRED EMBODIMENTS

Figure 2:
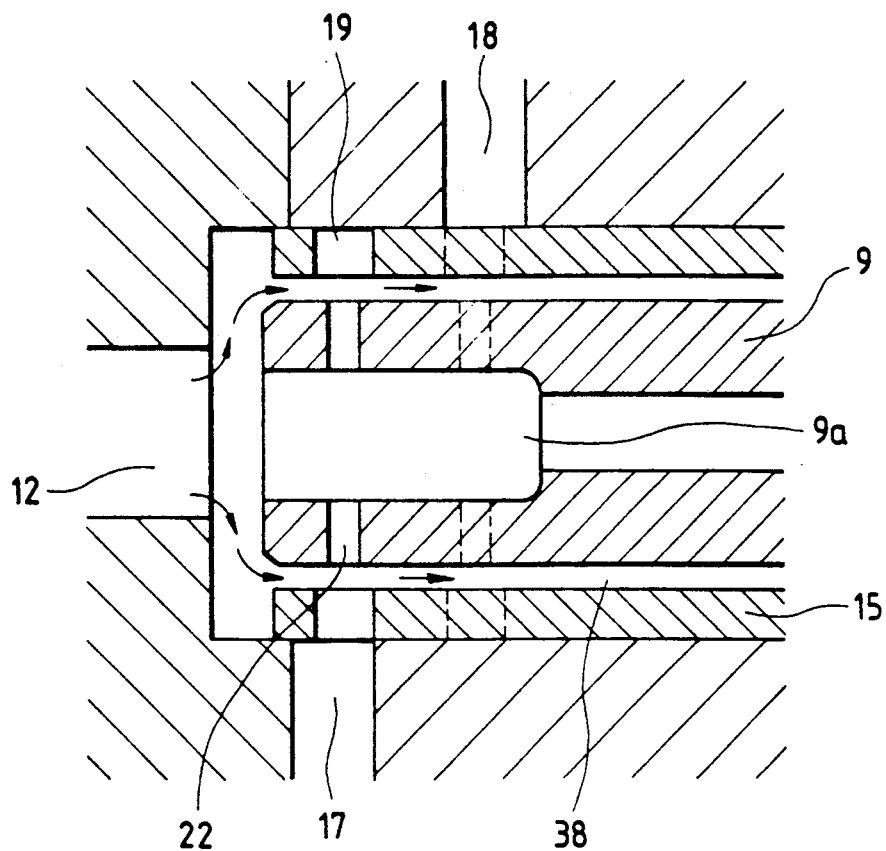
FIG. 2 is an enlarged view of a portion of the rotary control valve indicated by a circle II of FIG. 1(a)

Referring now to the drawings, wherein like reference characters designate like or corresponding parts throughout the several views, and more particularly to FIG. 1(a), there is shown a motor-operated rotary control valve 1 according to the present invention.

The rotary flow control valve 1 is composed of a valve unit 2 for controlling the flow rate of a hydraulic oil, and a motor unit 3 assembled with the valve unit 2 for controlling the operation of the same.

The valve unit 2 includes a valve housing 13 having three valve ports 10, 11 and 12, a hollow cylindrical outer housing 14 press-fitted in the valve housing 13, an inner housing 15 of a flanged tubular shape press-fitted in the outer housing 14, and a shaft 9.

Figure 5:
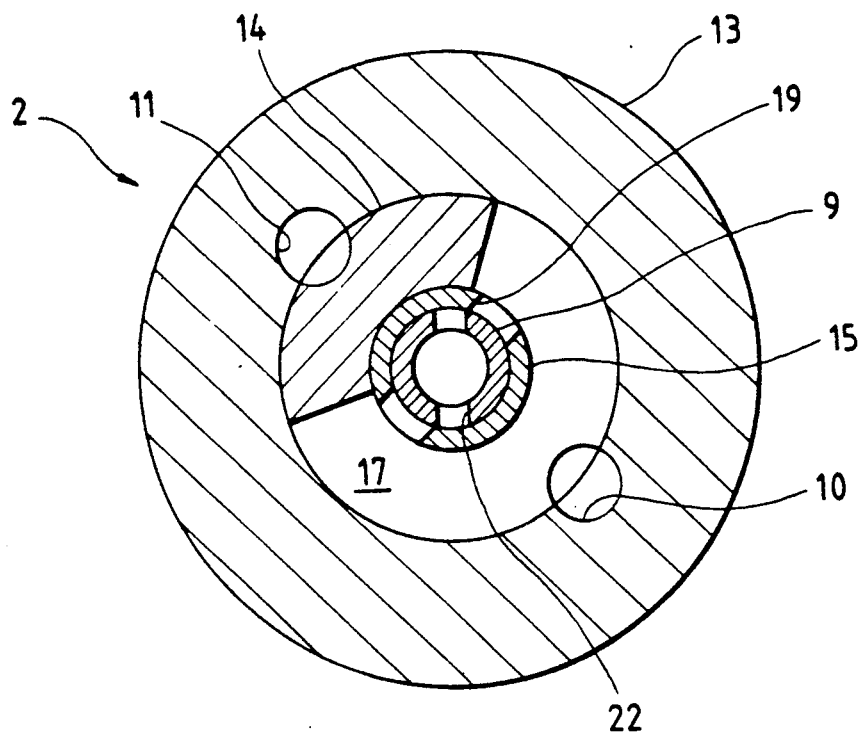
FIG. 5 is an enlarged cross-sectional view taken along line V—V of FIG. 1(a)
Figure 6:
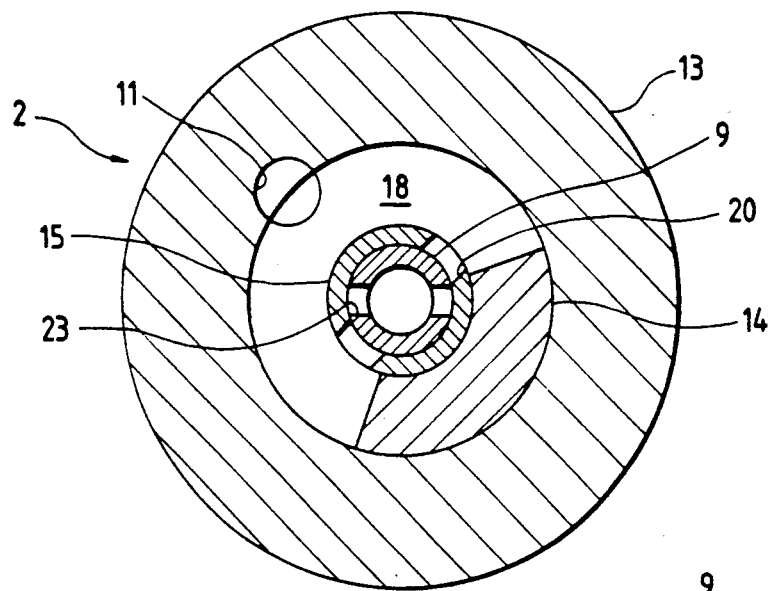
FIG. 6 is an enlarged cross-sectional view taken along line VI—VI of FIG. 1(a)

The outer housing 14 is recessed at its one end portion and a second portion adjacent to the opposite end by cutting out or removing the peripheral wall with one third of the full circumference left uncut. With the outer housing 14 thus recessed, there are two internal spaces 17, 18 defined between the valve housing 13 and the outer housing 14 in axially spaced relation to one another. These internal spaces 17, 18 extend arcuately along about two thirds of the full circumference of the outer housing 14 and are disposed in symmetry with each other about the axis of the shaft 9, as shown in FIGS. 5 and 6.

The shaft 9 is of a hollow cylinder having an internal hollow space extending throughout the length thereof and opening at opposite ends to the opposite end faces of the shaft 9. The shaft 9 has one end portion (left side in FIG. 1(a)) which is thinner than the opposite end portion and is rotatably received in a bearing hole 16 in the inner housing 15. The thin end portion of the hollow cylindrical shaft 9 has first and second orifices 22, 23 extending radially across the thickness of the hollow cylindrical shaft 9 to communicate the outside and the inside of the shaft 9. The number of each of the first and second orifices 22, 23 is two and two such orifices 22, 22 or 23, 23 are disposed diametrically opposite to one another (namely, in symmetrical relation to one another about the axis of the shaft 9), as shown in FIG. 7.

Figure 7:
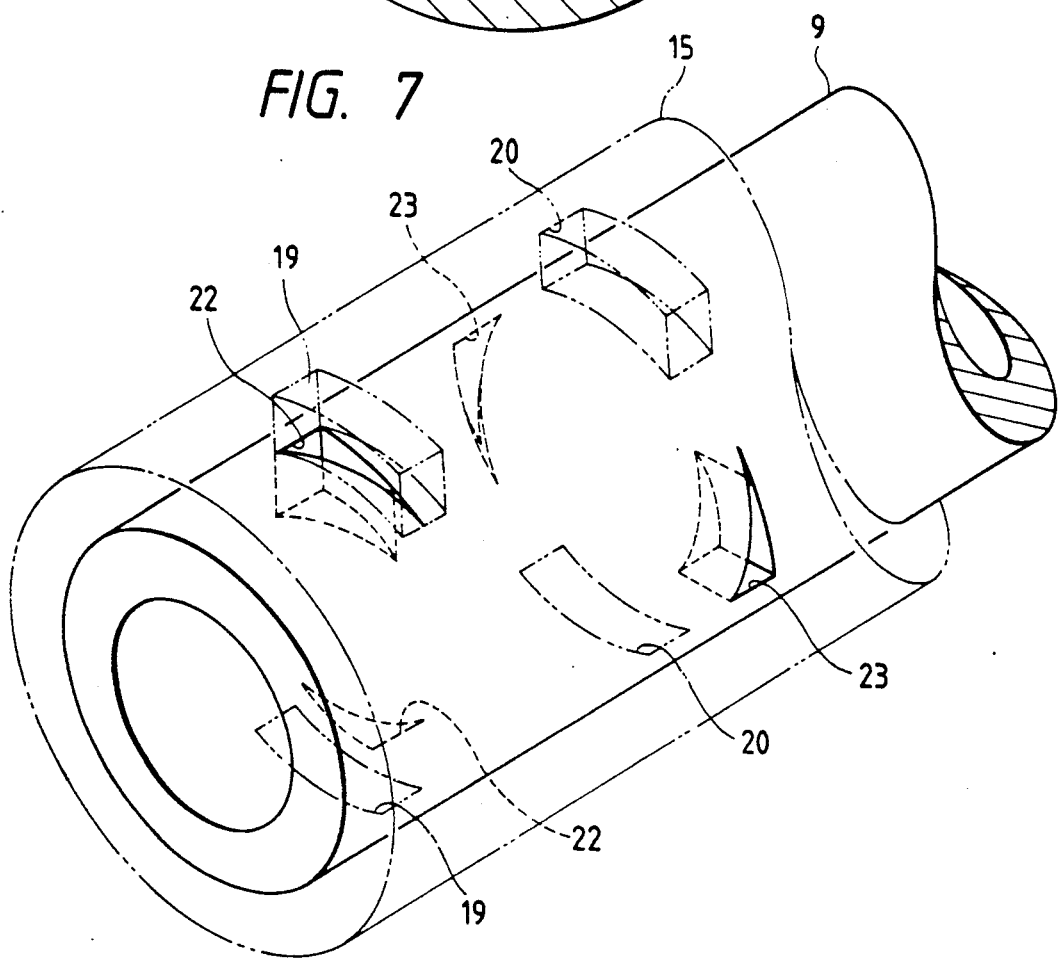
FIG. 7 is an enlarged perspective view of an end portion of a shaft of the rotary control valve shown in FIG. 1(a)
Figure 8:
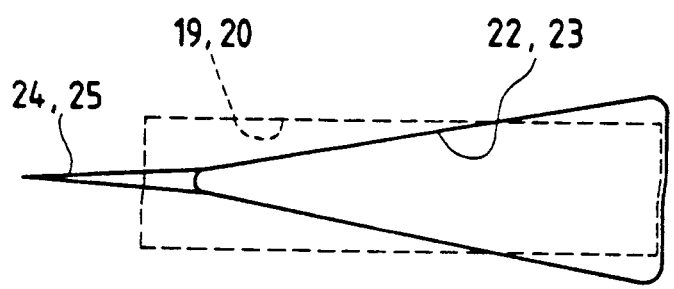
FIG. 8 is an enlarged plan view of an orifice formed in the shaft of FIG. 7.
Figure 9:
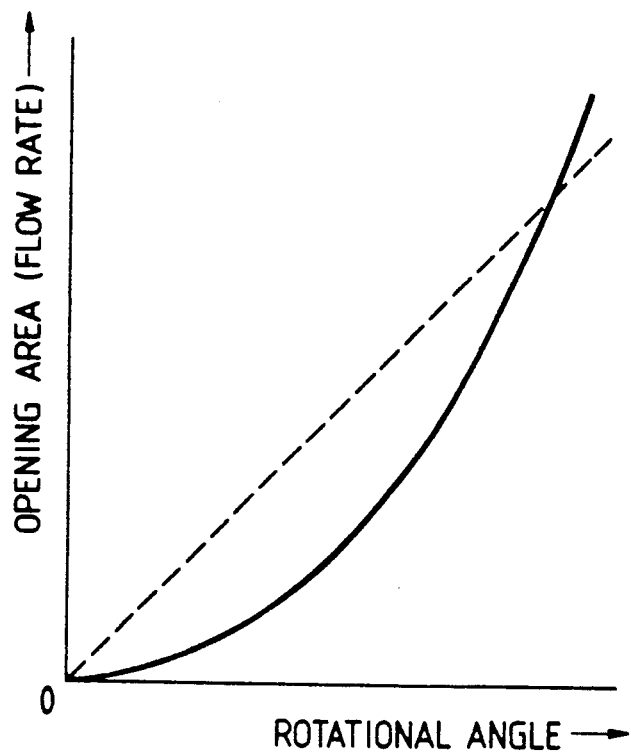
FIG. 9 a graph showing the relation between the flow rate through the rotary control valve and the angle of rotation of a shaft of the stepping motor.

The first and second orifices 22, 23 have a substantially isosceles triangular shape and are disposed such that the vertex and the base of each isosceles triangular orifice 22, 23 are spaced from one another in the circumferential direction of the valve shaft 9, as shown in FIG. 7, with its imaginary perpendicular lying in a plane extending perpendicular to the axis of the shaft 9. The isosceles triangular orifices 22, 22 or 23, 23 are directed in opposite direction with respect to the symmetrical axis of the shaft 9. In other words, the vertex of one of the isosceles triangular orifices 22, 22 or 23, 23 is directed to the base of the other isosceles triangular orifice 22 or 23 and hence the isosceles triangular orifices 22, 23 in each pair are directed in a same direction along the periphery of the shaft 9. As shown in FIG. 8, each of the orifices 22, 23 has a wedge-shaped notch or groove 24 or 25 extending contiguously from the vertex of the isosceles triangular orifice 22 or 23. The groove 24, 25 has a depth smaller than the thickness of the shaft 9 and progressively decreasing in a direction away from the vertex of the isosceles triangular orifice 22, 23.

The tubular inner housing 15 has a longitudinal portion rotatably supporting the thin end portion of the hollow cylindrical shaft 9, and first and second radial openings 19, 20 formed in this longitudinal portion of the inner housing 15 and respectively communicatable with the first and second orifices 22, 23 to vary the degree of communication (i.e., the opening area) therebetween as the shaft 9 is turned through a fixed angle. The number of each of the first and second radial openings 19, 20 is two and two such radial openings 19, 19 or 20, 20 are disposed diametrically opposite to one another (or in symmetrical relation to one another about the axis of the shaft 9), as shown in FIG. 7. Each of the radial openings 19, 20 has a substantially rectangular shape and is disposed such that parallel spaced longer or major sides of the rectangular radial opening 19, 20 extend circumferentially of the outer housing 15. Parallel spaced shorter or minor sides have a length smaller than the axial width or an extent of the internal spaces 17, 18 in the direction of the axis of the shaft 9, as shown in FIG. 2.

The length of the base of each isosceles triangular orifice 22, 23 (i.e., an extent of each orifice 22, 23 in the axial direction of the shaft 9) is slightly larger than the length of the minor sides of each rectangular radial opening 19, 20 and the distance between a tip end of the wedge-shaped notch 24, 25 and the base of the isosceles triangular orifice 22, 23 (i.e. an extent of each orifice 22, 23 including the associated notch 24, 25 in the circumferential direction of the shaft 9) is slightly longer than the length of the longer sides of each rectangular radial opening 19, 20, as shown in FIG. 8.

The inner housing 15 is set by a positioning pin 21 to the outer housing 14 in such angular relation that the two diametrically opposite first radial openings 19 are in communication with the internal space 17 at once and the two diametrically opposite second radial openings 20 are in communication with the internal space 18 at once.

Among the aforesaid three ports 10, 11, 12 formed in the valve housing 13, the port 10 communicates with the internal space 17 in the outer housing 14, the port 11 communicates with the internal space 18, and the port 12 confronts one end face of the thin end portion of the hollow cylindrical shaft 9 and communicates with the internal space 9a (FIG. 2) of the shaft 9.

The port 10 is connected by a first pipe A to a hydraulic oil pump 27, the port 11 is connected by a second pipe B to an oil tank 26, and the port 12 is connected by a third pipe C to a hydraulic cylinder 29.

The motor unit 3 includes a rotating shaft constituted by the hollow cylindrical shaft 9, a rotor assembly 31 firmly fitted over a longitudinal portion of the shaft 9 between the thin end portion and the opposite end portion of the shaft 9, and a stator assembly 32 mounted on the inside surface of a case 6 in confronting relation to the rotor assembly 31. The case 6 of the motor unit 3 and the housing 13 of the valve unit 2 jointly constitute a housing of the motor-operated rotary control valve 1.

The rotor assembly 31 includes a permanent magnet 31a and a pair of cores 31b disposed on opposite ends of the permanent magnet 31a and confronting one another in the axial direction of the shaft 9. Each of the cores 31b has a plurality of teeth on and along its outer peripheral surface, as shown in FIG. 1(b).

The stator assembly 32 includes a stator core 32a formed of a ferromagnetic substance, and a plurality (two in the illustrated embodiment) of stator coils 32b, 32c wound around the ferromagnetic stator core 32a. The stator core 32a has a plurality of teen formed on and along its inner peripheral surface in confronting relation to the teeth of the rotor core 31b, as shown in FIG. 1(b).

The motor unit 3 of the foregoing construction constitutes a stepping motor in which the rotor assembly 31 is rotated stepwise through fixed angles by a combined exciting force produced by and between the permanent magnet 31a and the stator coils 32b, 32c when the stator coils 32b, 32c are energized.

The shaft 9 constituting the rotating shaft of the motor unit 3 is rotatably supported at its one end by the inner housing 15 as described above. Thus, the inner housing 15 also serves as a sliding or plain bearing. The opposite end of the shaft 9 is rotatably supported by a sliding or plain bearing 30 which is press-fitted in a central hollow retainer portion or boss 4a of the case 4.

The opposite end portions of the shaft 9 have a same outside diameter as shown in FIG. 1(a).

The case 3 holding therein the motor unit 3 is partly fitted over a portion of the valve housing 13 and secured to the valve housing 13 by a plurality of screws 6 (only one shown), with an O-ring 5 of an elastic material disposed between the case 3 and the valve housing 13.

A circular stopper 35 is fitted in the boss 4a of the case 4 behind the plain bearing 30 with an O-ring 34 of an elastic material disposed between the stopper 35 and the boss 4a. The stopper 35 has a central engagement portion 35a fitted in the internal space 9a of the shaft 9 and an outer presser portion 35b held in abutment with an outer end face of the plain bearing 30. The stopper 35 is urged against the plain bearing 30 by an end cap 7 threaded into the boss 4a of the case 4.

Figure 4:
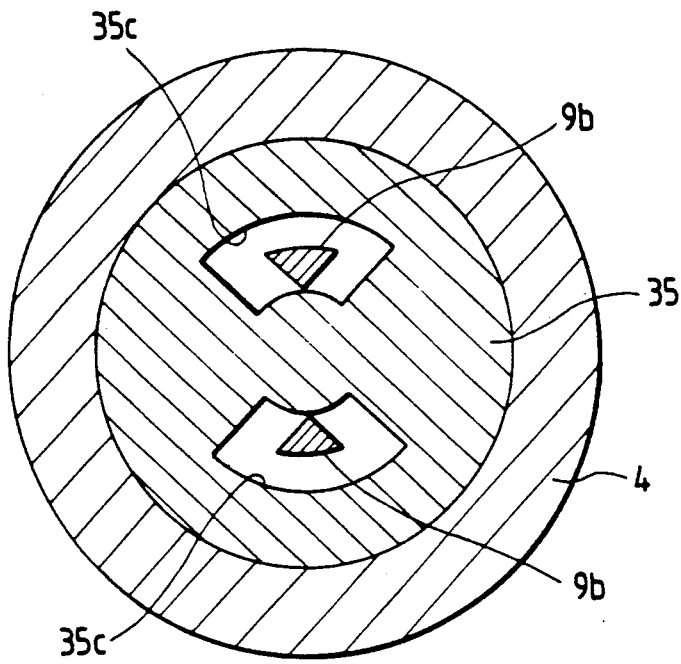
FIG. 4 is an enlarged cross-sectional view taken along line IV—IV of FIG. 1(a)

The shaft 9 has a pair of diametrically opposite prongs 9b on its one end face adjacent to the stopper 35. The prongs 9b have a substantially triangular shape in cross section as shown in FIG. 4 and are movably received with a pair of arcuate recesses 35c, respectively, in the stopper 35. In response to the rotation of the shaft 9, the prongs 9b engage the stopper 35 to limit angular movement of the shaft 9 within a fixed angular range.

Figure 3:
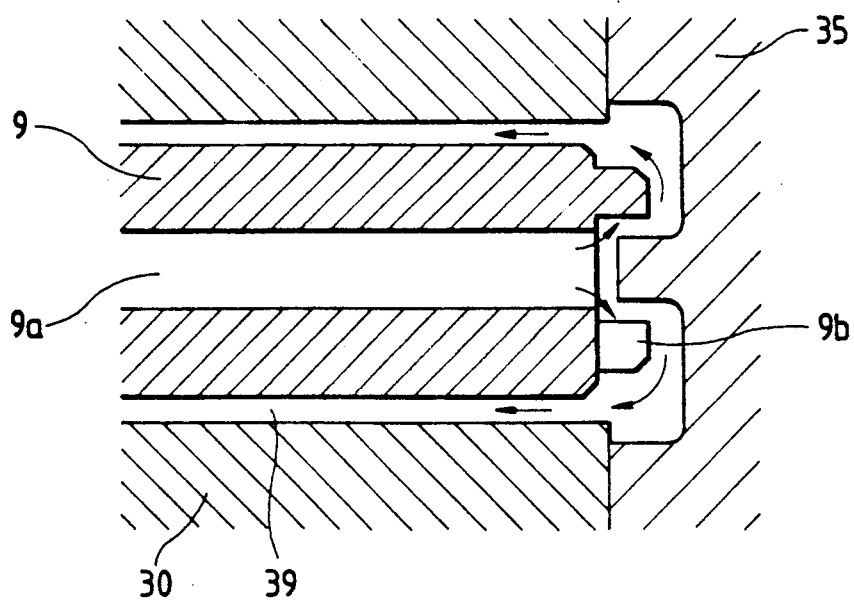
FIG. 3 is an enlarged view of a portion of the rotary control valve indicated by a circle III of FIG. 1(a)

As shown in FIG. 2, there is defined between the outside surface of the thin end portion of the hollow cylindrical shaft 9 and the inside surface of the tubular inner housing 15, an annular space 38 for the rotation of the shaft 9. Likewise, as shown in FIG. 3, there is defined between the outside surface of the thick end portion of the hollow cylindrical shaft 9 and the respective inside surface of the plain bearing 30 and the stopper 35, another annular space 39 for the rotation of the shaft 9.

The annular space 38 communicates with the port 12 and also communicates with the internal space 9a of the shaft 9 and an internal space 40 (FIG. 1(a)) of the motor unit 3. The annular space 39 communicates with the internal space 9a of the shaft 9 and the internal space 40 of the motor unit 3.

As shown in FIG. 1(a), a circular filter 37 is fixedly mounted in the internal space 9a of the shaft 9 adjacent to the prongs 9b. An annular filter 36 is fixedly disposed between the inner housing 15 and a portion of the shaft adjacent to the motor unit 3. The filters 36, 37 are formed of an oil-permeable fibrous material which is capable of blocking entrance of any foreign material into the internal space 40 of the motor unit 3 through an oil passage defined in and around the shaft 9.

Then, the construction of the electronic control circuit will be described below with reference to FIG. 10.

The electronic control circuit includes a microcomputer (hereinafter referred to as "MCU") 50 which is constructed as an arithmetic logic circuit consisting essentially of a central processing unit (CPU) 50a, a read only memory (ROM) 50b and a random access memory (RAM) 50c that are interconnected by a common bus 50d which also connects an input unit 50e and an output unit 50f for inputting and outputting data with respect to outside components of the MCU 50.

The input unit 50e of the MCU 50 receives a command signal N1 supplied from a command signal output circuit 60 for ordering a supply flow rate of hydraulic oil to the hydraulic cylinder 29, and a pair of detection signals N2, N3 for detecting resistance values of the respective stator coils 32b, 32c. The stator coils 32b, 32c are connected in series with a pair of resistors 72a, 72b via a pair of relay circuits 71a, 71b, respectively. The detection signals N2, N3 are drawn from junctions respectively between the resistor 72a and the relay circuit 71a and between the resistor 72b and the relay circuit 71b. With this arrangement, when relay coils of the respective relay circuits 71a, 71b are energized to changeover the relay contacts, constant-voltage regulated power supplies 70a, 70b supply a constant voltage through the resistors 72a, 72b to the corresponding stator coils 32b, 32c. Thus, the detection signals N2, N3 have respective values corresponding to resistance values of the respective stator coils 32b, 32c.

When the relay circuit 71a, 71b are not activated, each of the stator coils 32b, 32c is connected to one pair of opposite junctions of four transistors Tr1-Tr4 or Tr5-Tr8 connected in the form of a bridge circuit. One of the other pair of junctions of the bridge circuit is connected to a power supply +V while the other junction is grounded.

The output unit 50f of the MCU 50 outputs control signals S1, S2 for controlling energization of the respective relay circuits 71a, 71b. The control signals S1, S2 are supplied to the respective base terminals of a pair of transistors Trs1, Trs2 connected respectively to the relay coils of the relay circuits 71a, 71b so as to shift or change over the condition of the associated relay coils between the energized state and the de-energized state. The output unit 50f further outputs control signals T1-T8 for changing the condition of the respective transistors Tr1-Tr4 and Tr5-Tr8 of the bridge circuits between the conductive state and the non-conductive state. By the control signals T1-T8, the transistors Tr1-Tr4, Tr5-Tr8 are selectively conducted to change the direction of electric currents flowing through the stator coils 32b, 32c.

Figure 11:
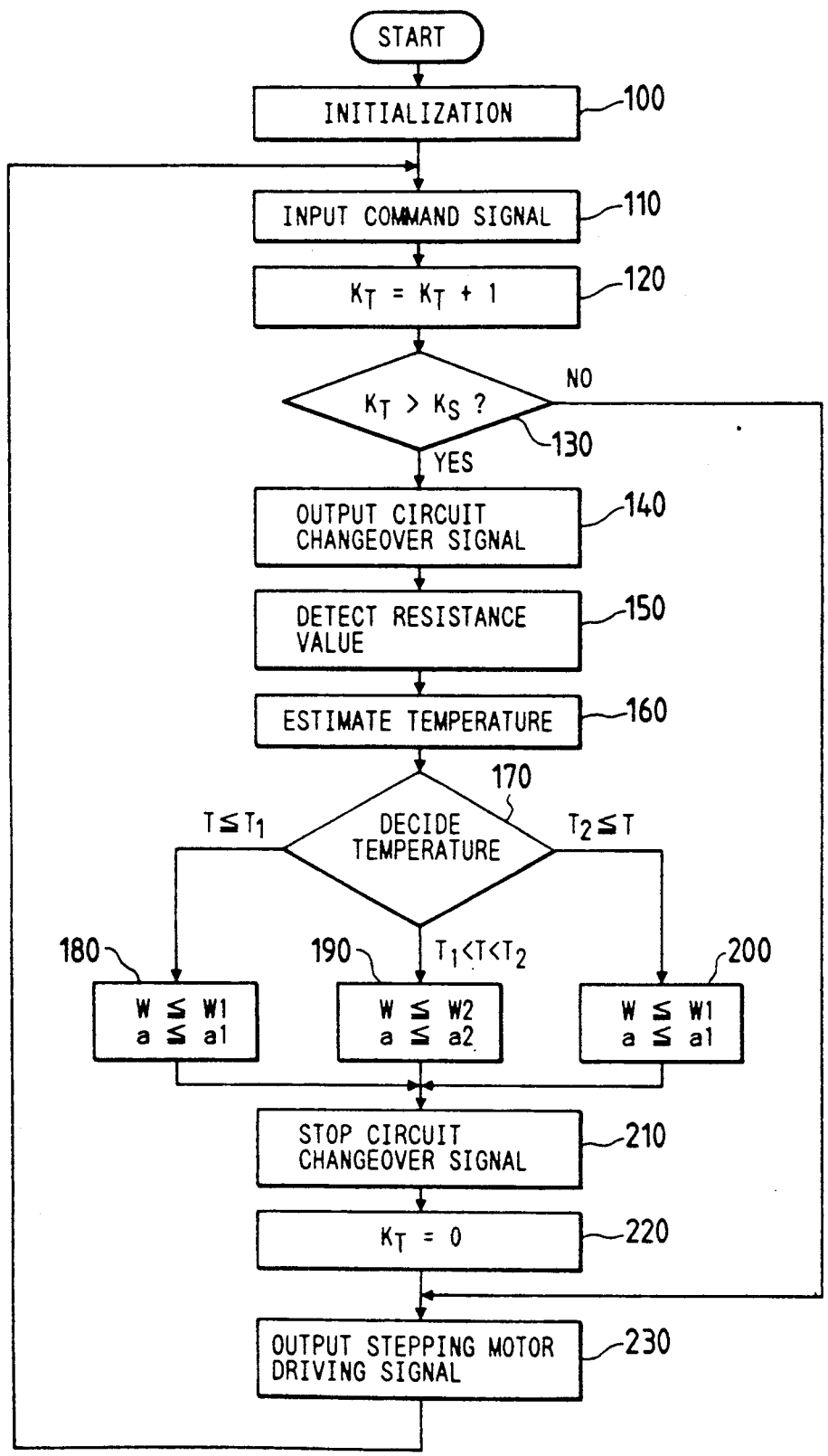
FIG. 11 is a flowchart showing a control routine achieved by a microcomputer of the control unit.

Operation of the motor-operated rotary control valve 1 of the foregoing construction is described below with reference to a flowchart shown in FIG. 11, in which is illustrated a control routine performed according to a program stored in the ROM 50b of the MCU 50 for the control of the supply flow rate of hydraulic oil to the hydraulic cylinder 29.

A first step 100 initializes necessary flags and counters and then the program advances to a step 110. The step 110 inputs a command signal supplied from the command signal output circuit 60 for ordering a supply flow rate of hydraulic oil. A step 120 following the step 110 increments a counter value "KT" by "1", thereafter the program advances to a step 130 which compares the counter value "KT" with a predetermined value "KS". When the counter value "KT" is greater than the predetermined value "KS", the program advances to a step 140. When the counter value "KT" is smaller than the predetermined value "KS", then the program jumps to a step 230.

The step 140 issues control signals S1 and S2 to the respective transistors Trs1 and Trs2. With the control signals S1, S2 thus issued, the relay coils of the respective relay circuits 71a, 71b are energized to change the relay contacts whereupon the stator coils 32b, 32c are connected respectively via the resistors 72a, 72b to the constant-voltage regulated power supplies 70a, 70b. The step 140 is followed by a step 150 which inputs detection signals N2 and N3 drawn from two junctions respectively between the resistor 72a and the stator coils 32b and between the resistor 72b and the stator coils 32c and then calculates resistance values of the respective stator coils 32b, 32c based on the detection signals N2, N3. A step 160 following the step 150 estimates from the calculated resistance values, temperatures of the respective stator coils 32b, 32c, namely the temperature T of hydraulic oil surrounding the stator coils 32b, 32c.

Figure 15:
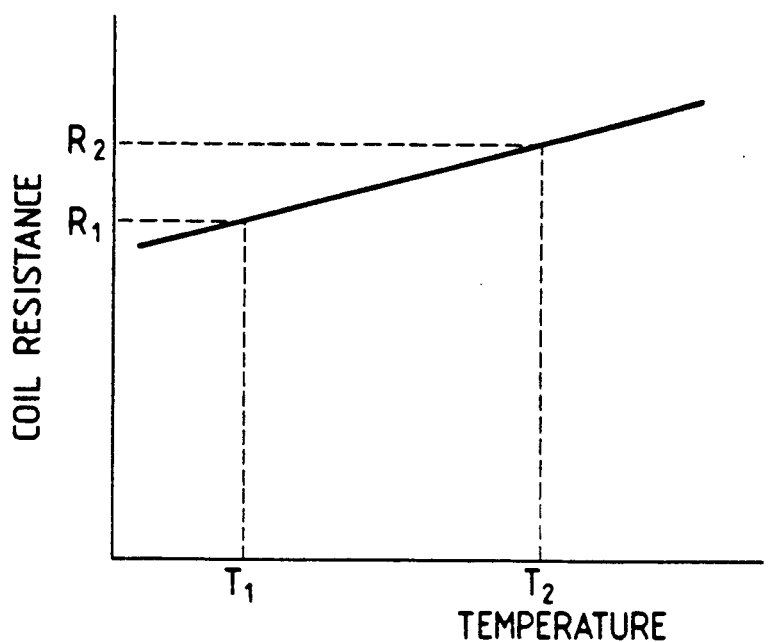
FIG. 15 is a graph showing the relation between the temperature of an oil and the resistance of a stator coil of the stepping motor.

Since the interior of the stepping motor unit 3 of the illustrated embodiment is filled with the hydraulic oil, the resistance values of the respective stator coils 32b, 32c vary with the temperature T of the hydraulic oil. FIG. 15 shows the relation between such hydraulic oil temperature T and the resistance value of the stator coils 32b, 32c. The estimated temperature T of hydraulic oil obtained in the step 160 is the average value of two hydraulic oil temperatures that are estimated from the respective resistance values of the stator coils 32b, 32c.

The program advances to a step 170 in which a judgment is made by comparing the estimated hydraulic oil temperature T with a lower limiting value T1 and an upper limiting value T2. When the estimated temperature T is equal to or smaller than the lower limiting value T1, the program goes on to a step 180. When the estimated temperature T is greater than the lower limiting value T1 and smaller than the upper limiting value T2, then the program advances to a step 170. When the estimated value T is equal to and greater than the upper limiting value T2, the program proceeds to a step 200. The steps 180 and 200 set the upper limiting value of the driving speed of the stepping motor to "W1" and also set the upper limiting value of the driving acceleration to "a1". The step 190 sets the upper limiting value of the driving speed to "W2" (where W2>W1) and also sets the upper limiting value of the driving acceleration to "a2" (where a2>a1).

Figure 13:
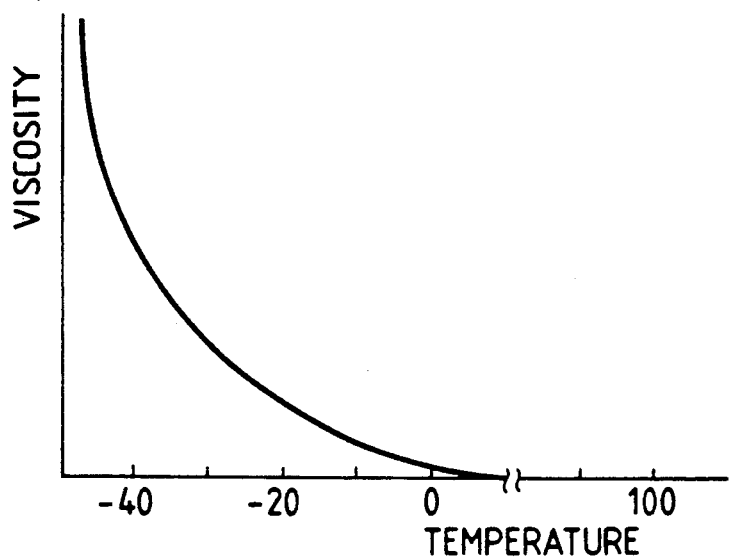
FIG. 13 is a graph showing the relation between the temperature of an oil and the viscosity of the oil.
Figure 14:
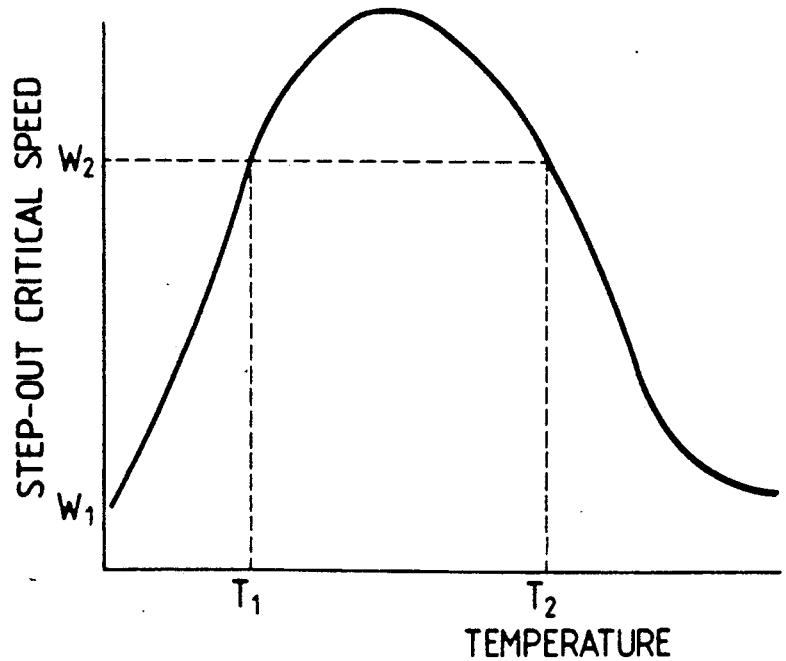
FIG. 14 is a graph showing the relation between the temperature of an oil and the step-out critical speed of the stepping motor shown in FIG. 1(b)
Figure 16:
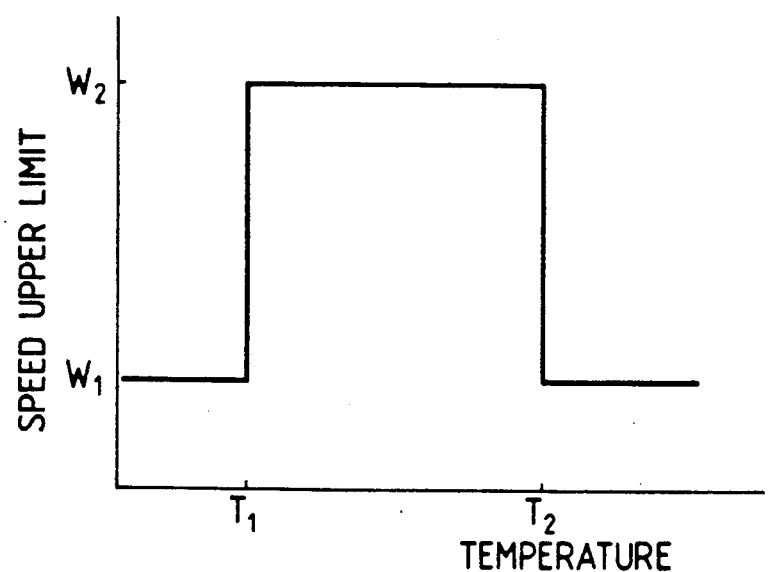
FIG. 16 is a graph showing the relation between the resistance of the stator coil and the upper limiting value of the rotational speed of the stepping motor.
Figure 17:
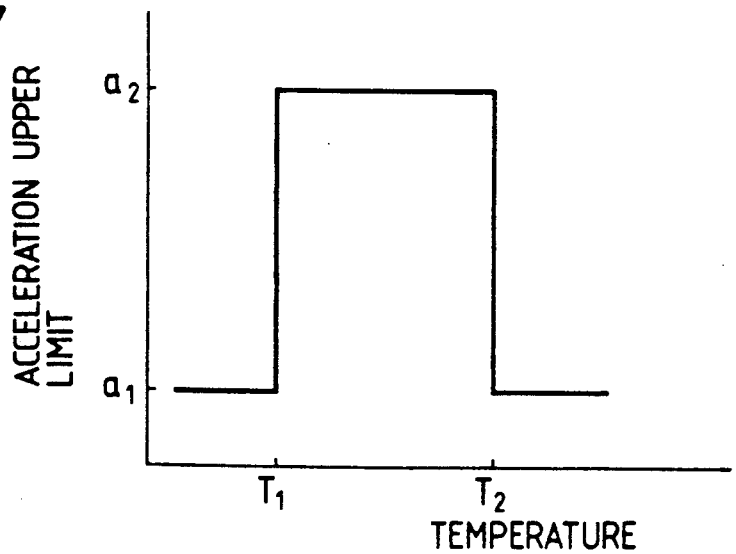
FIG. 17 is a graph showing the relation between the resistance of the stator coil and the upper limiting value of the rotational acceleration of the stepping motor.

Referring now to FIG. 13, there is shown a viscosity curve of the hydraulic oil as a function of the temperature. As appears clear from FIG. 13, the viscosity of the hydraulic oil increases exponentially as the oil temperature decreases. This means that the hydraulic oil viscosity decreases with an increase in temperature of the hydraulic oil. Thus, in the illustrated stepping motor whose interior is filled with the hydraulic oil, it occurs likely that only an insufficient torque is produced due to an extremely large viscosity of the hydraulic oil when the hydraulic oil temperature is extremely low. Conversely, at an extremely high temperature, the hydraulic oil viscosity is extremely low so that only a small viscous damping effect is obtained. Consequently, a critical speed at which the stepping motor falls out of step is lowered. FIG. 14 is a critical stepout speed curve of the stepping motor as a function of the temperature. According to the foregoing embodiment, the hydraulic oil temperature T is estimated by from resistance values of the respective stator coils 32b, 32c and, based on the estimated oil temperature T, the upper limiting value of the driving speed of the stepping motor and the upper limiting value of the driving acceleration of the stepping motor are changed in the manner as shown in FIGS. 16 and 17. With this speed change, the stepping motor is prevented from falling out of step or operating without synchronization at an extremely high temperature or at an extremely low temperature. Thus, the stepping motor has rapid and accurate response characteristics within a wide temperature range between the two extremities. After the steps 180, 190, 200, the program advances to a step 210.

The step 210 terminates output of the control signals S1, S2 whereupon the relay contacts of the respective relay circuits 71a, 71b are changed over to cause the stator coils 32b, 32c to be connected with the associated bridge circuits. The step 210 is followed by a step 220 which resets the counter value "KT" to "0". A sequence of controls from the steps 140 to the step 210 is performed each time the counter value "KT" becomes equal to the predetermined value "KS". This means that because the time variability of the hydraulic oil temperature is very small, calculation to estimate the hydraulic oil temperature may be made at intervals of 5 to 10 minutes.

The step 230 sets a target angle of rotation in accordance with the command signal N1 inputted in the step 110 and controls the operation of the stepping motor until its angle of rotation becomes equal to the target rotational angle. In this instance, an adequate phase-excitation of the stator coils 32b, 32c is performed so as to drive the rotor assembly 31 at a speed and an acceleration not exceeding the limiting values that were previously determined for the driving speed and acceleration by the steps 180-200.

Figure 10:
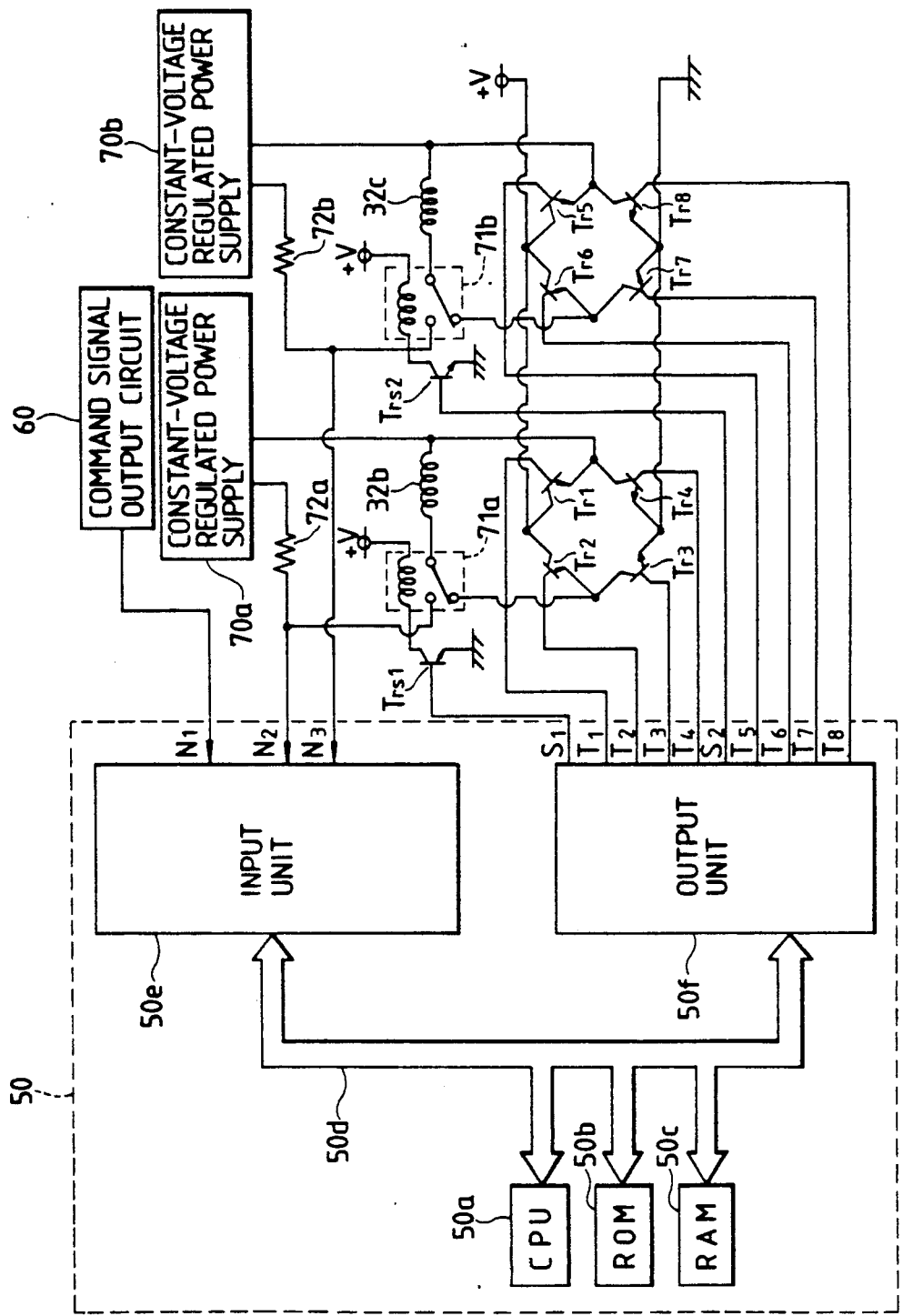
FIG. 10 is a circuit diagram of an electronic control unit for controlling the operation of the stepping motor shown in FIG. 1(b)
Figure 12:
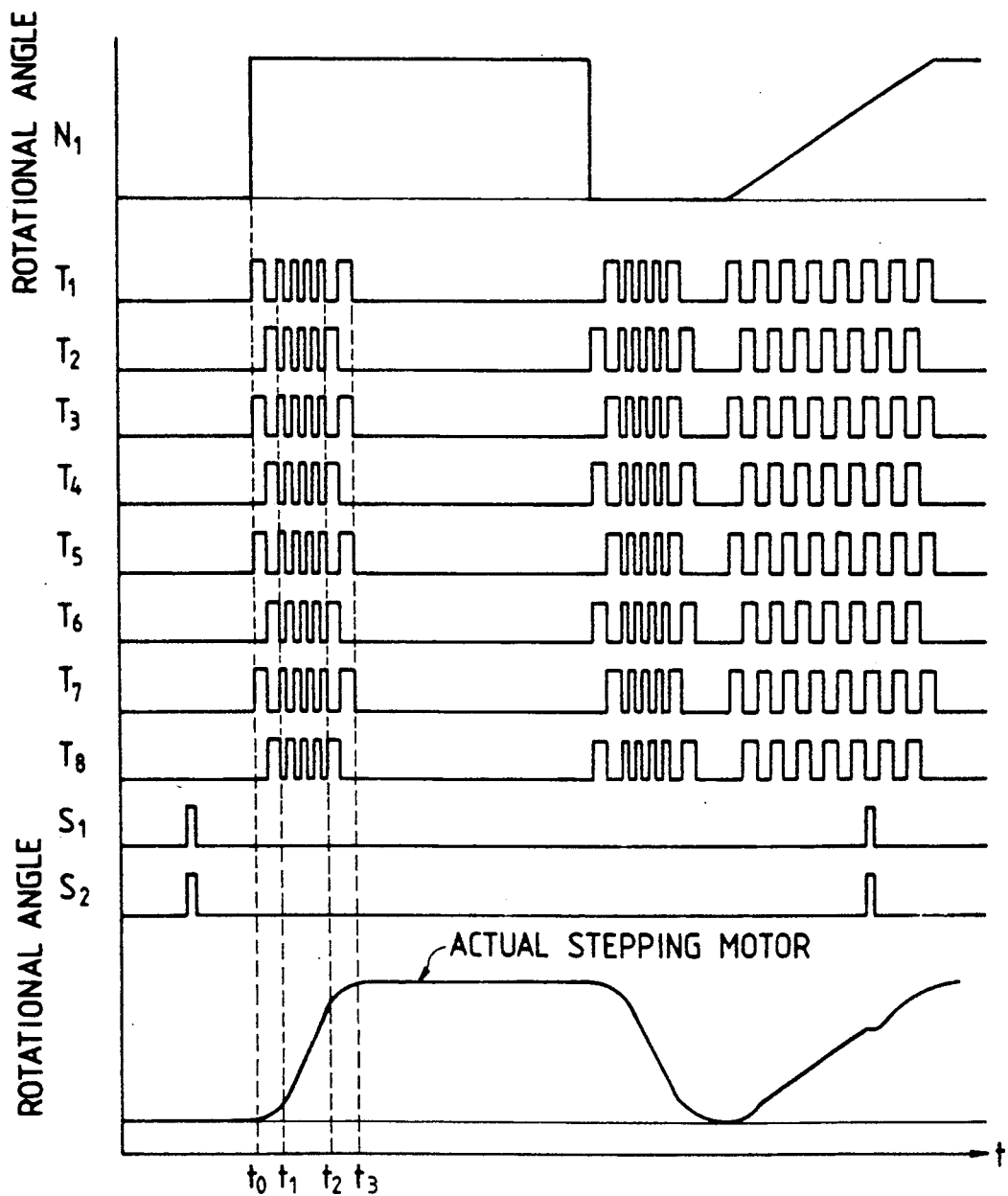
FIG. 12 is a time chart illustrative of the operation of the stepping motor.

More particularly, when a command signal N1 in the form of a pulse such as shown in FIG. 12 is inputted, a pulse signal having a predetermined pulse width or duration is supplied to the base terminals of the respective transistors Tr1, Tr3, Tr5 and Tr7 at a moment to so that the exciting currents flow through the stator coils 32b, 32c leftward in FIG. 10. Thereafter, the transistors Tr1, Tr3, Tr5 and Tr7 are cut off and at the same time the transistors Tr2, Tr4, Tr6 and Tr8 are driven to conduction whereupon the exciting currents flow through the respective stator coils 32b, 32c rightward in FIG. 10. Thus, the stator coils 32b, 32c are excited by the currents flowing alternately in opposite directions and, therefore, the rotor assembly 31 is driven at a rotational speed in correspondence with a cycle of switching of the exciting current flow direction.

Before the moment to, the rotor assembly 31 of the stepping motor is at rest. Once the rotor assembly 31 is driven to start rotating upon excitation of the stator coils 32b, 32c, a rotational acceleration is imparted on the rotor assembly 31. In order to keep the rotational acceleration below an upper limiting value of the driving acceleration determined by the foregoing steps 180-200, the transistors Tr1-Tr8 are driven by pulse signals whose repetition periods are determined in correspondence with the upper limiting value of the driving acceleration (the moment to to a moment t1 in FIG. 12). At the moment t1, the rotational speed of the rotor assembly 31 increases. Then in order to keep this rotational speed below an upper limiting value of the driving speed determined by the foregoing steps 180-200, the transistors Tr1-Tr8 are driven by pulse signals whose repetition periods are determined in correspondence with the upper limiting value of the driving speed (the moment t1 to a moment t2). When the rotational angle of the stepping motor approaches the target angle as at a moment t2, the rotational speed must be lowered to reduce the inertia which will act on the rotor assembly 31 when the rotor assembly 31 is stopped. With this speed change or reduction, a negative rotational acceleration is imparted on the rotor assembly 31. Thus, the transistors Tr1-Tr8 are driven by pulse signals having pulse repetition periods which are determined in correspondence with the upper limiting value of the driving acceleration that was set by the foregoing steps 180-200 (from the moment t2 to a moment t3).

When the stator coil 32b of the motor unit 3 is energized by the foregoing electronic control circuit, rotor assembly 31 turns through a desired angle and hence the shaft 9 turns concurrently in the clockwise direction in FIG. 5. With this clockwise movement of the shaft 9, the orifices 22 in the shaft 9 are brought into communication with the corresponding openings 19 in the inner housing 15, thereby communicating the port 10 and the port 12.

With this fluid communication, the high pressure hydraulic oil drawn by the oil pump 27 is supplied successively through the port 10 and the port 12 to the hydraulic cylinder 29.

In this instance, since the orifices 22 in the shaft 9 have a substantially isosceles triangular shape, the isosceles triangular orifices 22 are gradually overlapped with the rectangular openings 19 in inner housing 15 as the angle of rotation of the shaft 9 increases. Thus, the area of opening, that is, the degree of communication between the openings 19 and the orifices 22 gradually increase in response to the angular movement of the shaft 9.

When a great supply of hydraulic oil to the hydraulic cylinder 29 at one time is desired, the degree of angular movement of the rotor assembly 31 is increased to such an extent that the orifices 22 in the shaft 9 and the openings 19 in the inner housing 15 are in complete registry with each other to thereby provide a maximum opening area therebetween.

On the other hand, when the supply flow rate of hydraulic oil toward the hydraulic cylinder 29 is to be reduced, the angle of rotation of the rotor assembly 31 is reduced to thereby narrow the opening area between the orifices 22 and the openings 19.

When the hydraulic oil is to be returned from the hydraulic cylinder 29 to the oil tank 26, the rotor assembly 31 is turned through a predetermined angle so as to rotate the shaft 9 counterclockwise in FIG. 6. The angular movement of the shaft 9 causes the orifices 23 in the shaft 9 to communicate with the openings 20 in the inner housing 15 whereupon the port 11 is communicated with the port 12.

With this fluid communication, the hydraulic oil in the hydraulic cylinder 29 is returned successively through the port 12 and the port 11 to oil tank 26. When a great amount of hydraulic oil to be returned at one time from the hydraulic cylinder 29, the angle of rotation of the rotor assembly 31 is increased to such an extent that the orifices 23 and the openings 20 are brought into complete registry with each other to thereby provide a maximum opening area therebetween. Conversely, when a reduced amount of hydraulic oil is to be returned from the hydraulic cylinder 29, the angle of rotation of the rotor assembly 31 is reduced to thereby narrow the opening area between the orifices 23 and the openings 20.

According to the embodiment described above, the orifices 22, 23 formed in the thin end portion of the hollow cylindrical shaft 9 are small in length and hence are not influenced very much by changes in the viscosity of the hydraulic oil. Consequently, the flow rate of hydraulic oil is controlled by these orifices 22, 23 without substantial and, therefore, a highly accurate control of the flow rate of hydraulic oil can be obtained.

Since the annular space 38 defined between the thin end portion of the shaft 9 and the inner housing 15 communicates with the port 12, a part of the hydraulic oil flowing through the port 12 moves into the annular space 39, thereby lubricating the thin shaft end portion and the inner housing 15. A part of the hydraulic oil flowing through the port 12 also flows through the internal space 9a of the hollow cylindrical shaft 9 and is led to the opposite end of the shaft 9 from which the hydraulic oil further flows into the annular space 39 defined between the opposite end of the shaft 9 and the plain bearing 30. Thus, the opposite end of the shaft 9 and the plain bearing 30 are also lubricated.

With this forcible supply of oil to the bearing portions, oil films are always provided between the opposite end portions of the shaft 9 and the associated bearings 15, 30 even when the peripheral speed of the shaft 9 is very low. Accordingly, an excellent bearing performance can be obtained.

Furthermore, the shaft 9 of the present invention is hollow and hence is light in weight and capable of responding rapidly and accurately when driven.

Another advantages is that the permanent magnet and the electromagnetic coil of the motor unit 3 are cooled by a part of the hydraulic oil which flows through the annular spaces 38, 39 into the internal space 40 of the motor unit 3 and fills the internal space 40. With this cooling, the efficiency of the motor unit 3 is not deteriorated at all. The hydraulic oil filling the interior space 40 has an effect of braking the angular movement of the shaft 9, which is effective to avoid overrunning of the shaft which would otherwise occur due to inertia when the angular movement of the shaft 9 is stopped.

The opposite end portions of the shaft 9 have a same outside diameter and hence the shaft 9 has an excellent pressure balance in the axial direction thereof.

Figure 18:
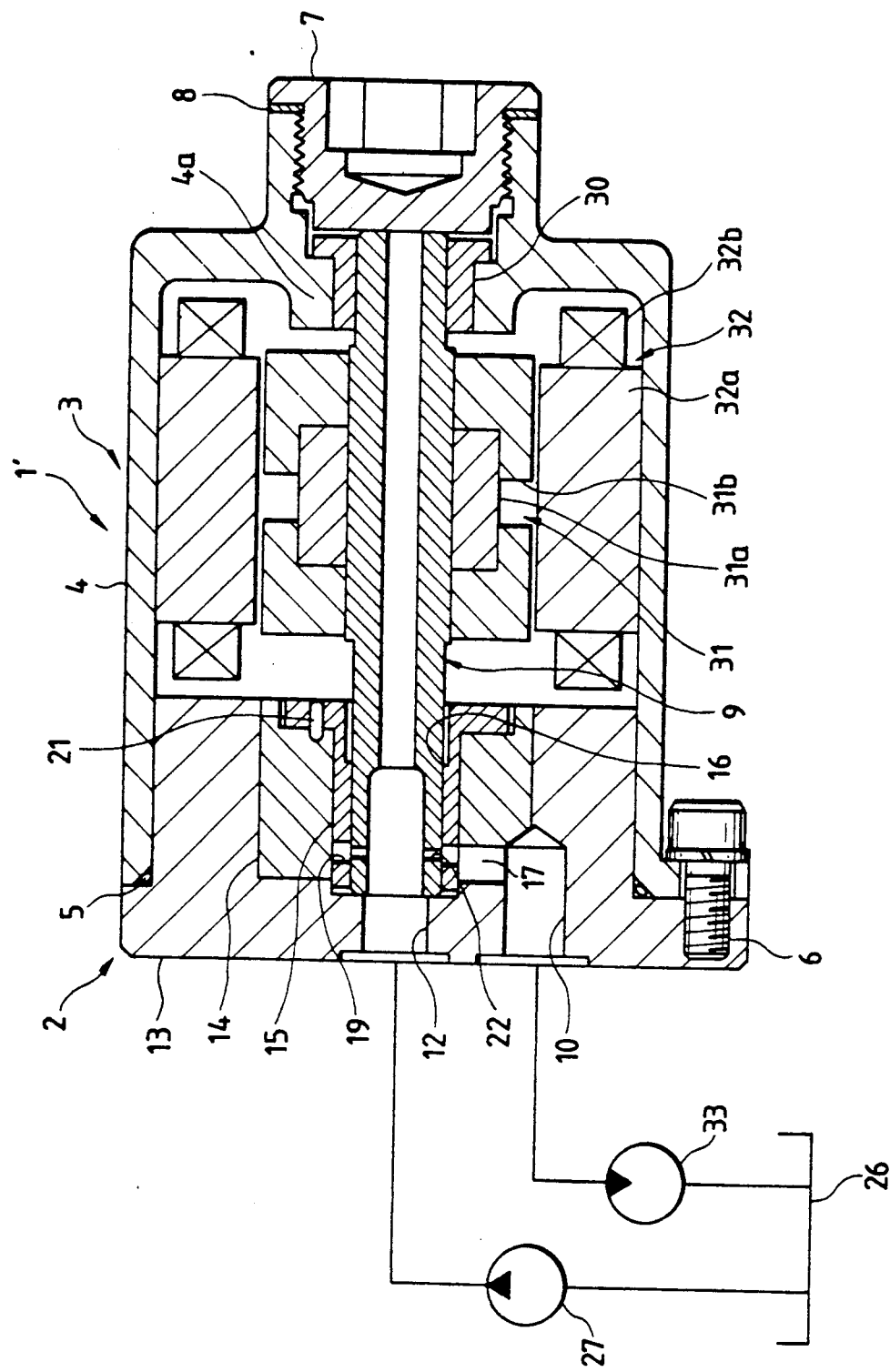
FIG. 18 is a longitudinal cross-sectional view of a rotary control valve according to another embodiment of the present invention.

FIG. 18 shows a modified form of the motor-operated rotary control valve according to the present invention. The modified rotary control valve 1' is constructed as a two-way valve instead of the three-way rotary control valve 1 of the embodiment described above with reference to FIG. 1(a). More particularly, the two-way rotary control valve 1' has two connectors in the form of ports 10 and 12. The port 11 is connected with an oil pump 27 while the port 12 is connected with an oil hydraulic actuator such as an oil hydraulic motor 33. In the illustrated embodiment, the shaft 9 has an end (right end in FIG. 18) positioned by an end cap 7 which is threaded into a central bearing portion or boss 4a of the case 4 with a gasket 8 disposed between the end cap 7 and the boss 4a. Other structural details of the modified rotary control valve 1' are substantially the same as those of the rotary control valve 1 of the first-mentioned embodiment and hence a description is not necessary.

Figure 19:
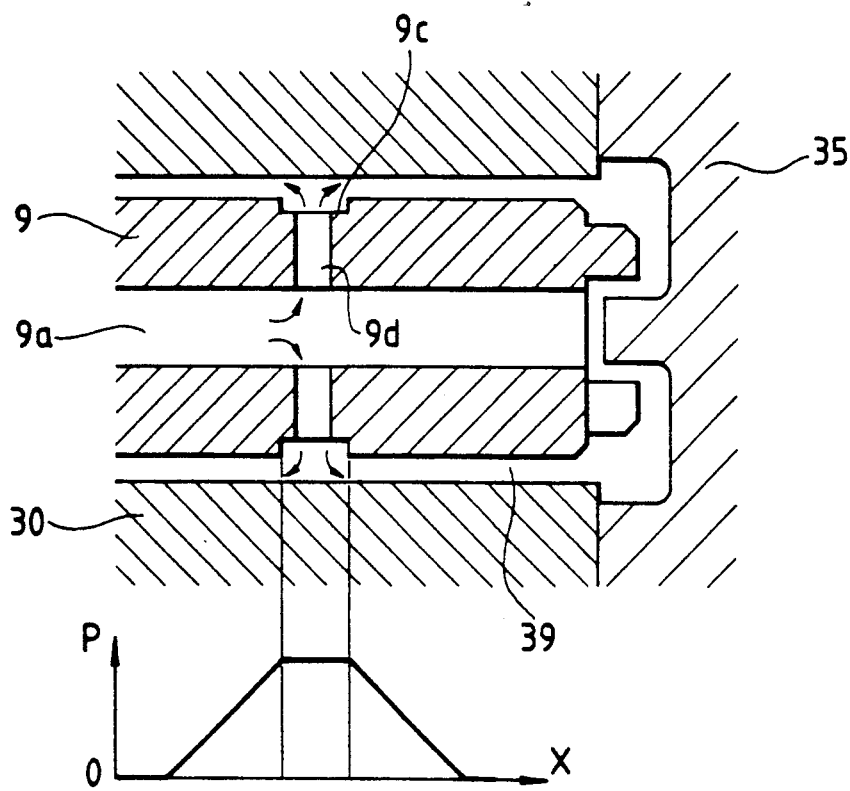
FIG. 19 is an enlarged cross-sectional view of a portion of a rotary control valve according to a further embodiment of the invention.

FIG. 19 illustrates a portion of a modified valve unit according to the present invention. This valve unit is similar to the valve unit shown in FIG. 3 but differs therefrom in that the shaft 9 has an annular groove 9c in its outer peripheral surface, and a radial through-hole 9d extending diametrically across the shaft 9 and opening at opposite ends to the annular groove 9c.

With this construction, a portion of the hydraulic oil flowing through the internal space 9a of the shaft 9 moves into the radial through-hole 9d and then is guided into the annular groove 9c, thereby forming a hydrostatic bearing system between the shaft 9 and the plain bearing 30. With the hydrostatic bearing system thus provided, a constant gap is maintained between the plain bearing 30 and the shaft 9. The curve appearing below the plain bearing 30 shown in FIG. 19 is a graphic illustration of pressure distribution over the surface of the plain baring 30 along the length thereof.

The motor-operated rotary control valves of the foregoing embodiments are useful in various applications. A typical example of such applications is a hydraulic suspension system for automobiles in which the rotary control valve operates to control the flow rate of hydraulic oil to be supplied to the hydraulic suspension system.

The electronic control circuit described above with reference the embodiment shown in FIGS. 1(a) through 17 is constructed such that an upper limiting value of the driving speed and an upper limiting value of the driving acceleration are commonly used both in the event of an extremely high estimated hydraulic oil temperature and in the event of an extremely low estimated hydraulic oil temperature. however different upper limiting values may be set for the two extreme estimated hydraulic oil temperatures.

Figure 20:
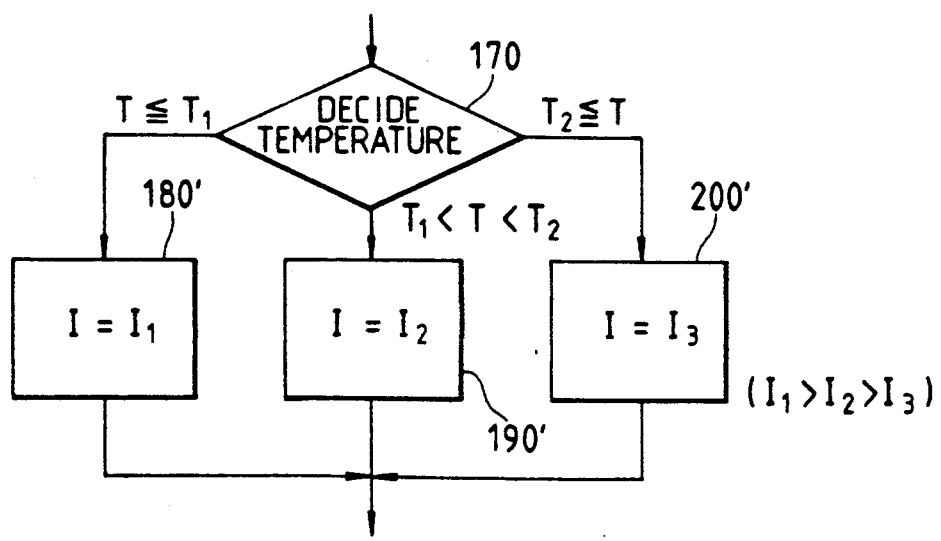
FIG. 20 is a flowchart showing a modification of a part of the flowchart shown in FIG. 11.

Furthermore, the out-of-step protection of the stepping motor is obtained according to the foregoing embodiments, by lowering the upper limiting values of the driving speed and acceleration of the stepping motor both in the event of an extremely high estimated hydraulic oil temperature and in the event of an extremely low temperature. The step-out of the stepping motor at an extremely low temperature is caused by an insufficient torque resulting from a very large viscosity of the hydraulic oil. This step-out of the stepping motor can be avoided by increasing the driving torque of the stepping motor per se. At an extremely high temperature, the viscosity of the hydraulic oil is very low and hence the load torque is very small. Thus, the stepping motor can be started with a very small driving torque. With this small driving torque required, step-out of the stepping motor resulting from an insufficient damping is unlikely to occur. Consequently, an effective out-of-step protection may be obtained when the steps 180-200 of the flowchart shown in FIG. 11 are replaced by steps 180'-200' of a flowchart shown in FIG. 20. The steps 180'-200' vary exciting current values I (where I1>I2->I3) to be supplied to the stator coils 32b, 32c in accordance with an estimated temperature T of the hydraulic oil. As the estimated hydraulic oil temperature T decreases, the current values I in the stator coils 32b, 32c increase and hence the driving torque of rotor assembly 31 is increased. However, when the temperature of the hydraulic oil is extremely high, a large angle of rotation brings about, in stead of a small drive force, a large inertia of the rotor assembly which tends to cause step-out of the stepping motor. In this instance, it is highly desirable that a control of the driving speed and acceleration is combined with a control of the drive torque (i.e., control of the exciting current values in the stator coils 32b, 32c).

In the illustrated embodiments described above, the stepping motor is excited in bipolar two-phase excitation mode. The excitation mode of the stepping motor is not limited to this mode and the present invention is effectively operable when another excitation mode is employed.

According to the embodiments described above, the estimated temperature of the hydraulic oil is detected at fixed intervals of time. Preferably, such detection of the estimated hydraulic oil temperature is carried out rapidly within a very short time so as not to exert influence on the drive control of the stepping motor. Furthermore, it is possible to detect the hydraulic oil temperature while the rotor assembly 31 of the stepping motor is at rest for a time period longer than a predetermined value.

In the illustrated embodiment, the electronic control circuit is constructed by employing a microcomputer. It is to be noted that all the functions of the electronic control circuit may be realized by hardware.

Obviously various minor changes and modifications of the present invention are possible in the light of the above teaching. It is therefore to be understood that within the scope of the appended claims the invention may be practiced otherwise than as specifically described.

What is claimed is:

1. A stepping motor unit comprising:
   (a) a stepping motor including a rotor mounted on a rotating shaft and a stator disposed confronting to said rotor, said stator including a stator core formed of a ferromagnetic substance and stator coils wound around said ferromagnetic stator core;
   (b) a housing sealingly holding therein said stepping motor and filled with an oil, said stepping motor held in said housing having an interior space filled with said oil so that said rotor and said stator are immersed in said oil;
   (c) means for detecting a temperature of said oil which fills in said housing and in which said rotor and said stator are immersed;
   (d) means for varying an upper limit value of a rotational speed of said stepping motor and an upper limit value of a rotational acceleration of said stepping motor based on a current viscous condition of said oil based on the temperature detected by said temperature detecting means; and
   (e) means for driving said stepping motor at a rotational speed and a rotational acceleration which fall in ranges, respectively, not exceeding said upper limit values.

2. A stepping motor unit as claimed in claim 1, wherein said temperature detecting means comprising means for detecting resistance values of the respective stator coils as a temperature of said oil.

3. A stepping motor unit as claimed in claim 2, further including means engageable with said shaft for limiting angular movement of said shaft within a fixed range.

4. A stepping motor unit comprising:
   (a) a stepping motor including a rotor mounted on a rotating shaft and a stator confronting said rotor, said stator including a stator core formed of a ferromagnetic substance and stator coils wound around said ferromagnetic stator core;
   (b) a housing sealingly holding therein said stepping motor and filled with an oil;
   (c) means for detecting a temperature of said oil within said housing, said temperature detecting means comprising means for detecting resistance values of the respective stator coils as a temperature of said oil;
   (d) means for varying an upper limit value of a rotational speed of said stepping motor and an upper limit value of a rotational acceleration of said stepping motor in view of a current viscous condition of said oil based on the temperature detected by said temperature detecting means;
   (e) means for driving said stepping motor at a rotational speed and a rotational acceleration which fall in ranges, respectively, not exceeding said upper limit values; and (f) means engageable with said shaft for limiting angular movement of said shaft within a fixed range, wherein said shaft is rotatably supported by said housing and has at least one prong projecting from an end face of said shaft, said limiting means comprising a stopper mounted in said housing and having a recess movably receiving therein said prong, said recess extending arcuately about the axis of said shaft through said fixed angular range.

5. A stepping motor unit comprising:
(a) a stepping motor;
(b) a housing sealingly holding therein said stepping motor and filled with an oil;
(c) means for detecting a temperature of said oil within said housing;
(d) means for varying an upper limit value of the rotational speed of said stepping motor and an upper limit value of the rotational acceleration of said stepping motor based on a current viscous condition of said oil based on the temperature detected by said temperature detecting means; and
(e) means for driving said stepping motor at a rotational speed and a rotational acceleration which fall in ranges, respectively, not exceeding said upper limit values, wherein said stepping motor includes a shaft having a hollow internal space extending longitudinally throughout a length thereof, said housing including first and second bearing portions rotatably retaining therein opposite end portions of said hollow shaft, said opposite end portions of said hollow shaft and said first and second bearing portions of said housing jointly defining therebetween annular spaces, said internal spaces of said hollow shaft being filled with said oil flowing therein via said annular spaces.

6. A stepping motor unit comprising:
(a) a stepping motor including a rotor mounted on a rotating shaft and a stator disposed confronting said rotor, said stator including a stator core formed of a ferromagnetic substance and stator coils wound around said ferromagnetic stator core;
(b) a housing sealingly holding therein said stepping motor and filled with an oil, said stepping motor held in said housing having an interior space filled with said oil so that said rotor and said stator being immersed with said oil;
(c) means for detecting a temperature of said oil which fills in said housing and in which said rotor and said stator are immersed;
(d) means for controlling exciting current values to be supplied to said stator coils in such a manner that as the temperature of oil decreases, said exciting current values increase; and
(e) means for driving said stepping motor by exciting said stator coils at said control current values.

7. A stepping motor unit as claimed in claim 6, wherein said temperature detecting means comprises means for detecting resistance values of the respective stator coils as a temperature of said oil.

8. A stepping motor unit as claimed in claim 6, further including means engageable with said shaft for limiting angular movement of said shaft within a fixed range.

9. A stepping motor unit comprising:
(a) a stepping motor including a rotor mounted on a rotating shaft and a stator disposed confronting said rotor, said stator including a stator core formed of a ferromagnetic substance and stator coils wound around said ferromagnetic stator core,
(b) a housing sealingly holding therein said stepping motor and filled with an oil;
(c) means for detecting a temperature of said oil within said housing;
(d) means for controlling exciting current values to be supplied to said stator coils in such a manner that as the temperature of oil decreases, said exciting current values increase;
(e) means for driving said stepping motor by exciting said stator coils at said controlled current values; and
(f) means engageable with said shaft for limiting angular movement of said shaft within a fixed range, said shaft being rotatably supported by said housing and has at least one prong projecting from an end face of said shaft, said limiting means comprising a stopper mounted in said housing and having a recess movably receiving therein said prong, said recess extending arcuately about the axis of said shaft through said fixed angular range.

10. A stepping motor unit comprising:
(a) stepping motor including a rotor mounted on a rotating shaft and a stator disposed confronting said rotor, said stator including a stator core formed of a ferromagnetic substance and stator coils wound around said ferromagnetic stator core,
(b) a housing sealingly holding therein said stepping motor and filled with an oil;
(c) means for detecting a temperature of said oil within said housing;
(d) means for controlling exciting current values to be supplied to said stator coils in such a manner that as the temperature of oil decreases, said exciting current values increase; and
(e) means for driving said stepping motor by exciting said stator coils at said controlled current values, wherein said shaft has a hollow internal space extending longitudinally throughout the length thereof, said housing including first and second bearing portions rotatably retaining therein opposite end portions of said hollow shaft, said opposite and portions of said housing jointly defining therebetween annular spaces, said internal space of said hollow shaft being filled with said oil flowing therein via said annular spaces.

11. A motor-operated rotary control valve comprising:
(a) a rotary valve unit having first and second ports adapted to be connected to an external oil hydraulic line, and a shaft disposed in a flow path communicating said first and second ports, said shaft being rotatable to change the flow rate of a hydraulic oil flowing through said flow path;
(b) a stepping motor having a rotating shaft constituted by said shaft of said rotary control valve unit;
(c) a housing sealingly holding a therein said rotary control valve unit and said stepping motor and filled with said hydraulic oil;
(d) means for detecting the temperature of said hydraulic oil within said housing;
(e) means for varying an upper limiting value of the rotational speed of said stepping motor and an upper limiting value of the rotational acceleration of said stepping motor in view of a current viscous condition of said hydraulic oil based on the temperature detected by said temperature detecting means; and (f) means for driving said stepping motor at a rotational speed and a rotational acceleration which fall in ranges, respectively, not exceeding said upper limiting values.

12. A motor-operated rotary control valve as claimed in claim 11, wherein said stepping motor is composed of a rotor mounted on said rotating shaft and a stator disposed in confrontation to said rotor, said stator including a stator core formed of a ferromagnetic substance and stator coils wound around said ferromagnetic stator core, said temperature detecting means comprising means for detecting resistance values of the respective stator coils as a temperature of said oil.

13. A motor-operated rotary control valve as claimed in claim 11, wherein said shaft has a hollow internal space extending longitudinally throughout the length thereof, at least one end portion and the opposite end portion of said shaft having a hollow cylindrical shape, said one hollow cylindrical end portion having an orifice extending radially across the thickness of said one hollow cylindrical end portion and communicating the outside and the inside of said one hollow cylindrical end portion, said housing including first and second bearing portions rotatably retaining said one and opposite end portions, respectively, of said shaft, said first bearing portion having an opening adapted to be communicated with said orifice when said shaft rotates, said first and second ports being formed in said housing and communicating with said opening in said first bearing portion and the inside of said one hollow cylindrical end portion, respectively.

14. A motor-operated rotary control valve as claimed in claim 13, wherein said first port is adapted to be connected with an inlet of the external oil hydraulic line, the inside of said one hollow cylindrical end portion of said shaft being adapted to be connected with an outlet of the external oil hydraulic line via said second port.

15. A motor-operated rotary control valve as claimed in claim 13, wherein the inside of said one hollow cylindrical end portion of said shaft is adapted to be connected with an inlet of the external oil hydraulic line via said second port, said first port being adapted to be connected with an outlet of the external oil hydraulic line.

16. A motor-operated rotary control valve as claimed in claim 13, wherein said one hollow cylindrical end portion further has a second orifice extending radially across the thickness of said on hollow cylindrical end portion and communicating the outside and the inside of said one hollow cylindrical end portion, said first bearing portion having a second opening adapted to be communicated with said second orifice when said shaft rotates, said housing further having a third port communicating with said second opening and adapted to be connected with the external oil hydraulic line.

17. A motor-operated rotary control valve as claimed in claim 16, wherein said first port is adapted to be connected with a hydraulic power supply source via the external oil hydraulic line, said second port being adapted to be connected with an oil hydraulic actuator via the external oil hydraulic line, said third port being adapted to be connected with a drain line.

18. A motor-operated rotary control valve as claimed in claim 11, wherein said one hollow cylindrical end portion of said shaft and said first bearing portion jointly define therebetween a first annular space, said first annular space communicating with said second port, said opposite hollow cylindrical end portion of said shaft and said second bearing portion jointly defining therebetween a second annular space, said second annular space communicating with said second port via said hollow interior space in said shaft including the inside of said one hollow cylindrical end portion of said shaft, a part of said hydraulic oil flowing through said flow path being permitted to flow into said first and second annular spaces via said second port.

19. A motor-operated rotary control valve as claimed in claim 18, further including a first filter of an oil-permeable material disposed in said hollow internal space of said shaft adjacent to said second bearing portion, and a second filter of an oil-permeable material disposed between said first bearing and said one hollow cylindrical end portion of said shaft.

20. A motor-operated rotary control valve as claimed in claim 18, wherein said opposite hollow cylindrical end portion of said shaft has in its outer peripheral surface an annular groove opening to said second annular space, and a radial through-hole extending diametrically across said opposite hollow cylindrical end portion and communicating at opposite ends to said annular groove.

21. A motor-operated rotary control valve as claimed in claim 13, wherein said orifice has a substantially isosceles triangular shape and is disposed such that the vertex and the base of said isosceles triangular orifice are spaced from one another in the circumferential direction of said shaft with its imaginary perpendicular lying in a plane extending perpendicular to the axis of said shaft, said radial opening in said first bearing portion having a substantially rectangular shape and being disposed such that parallel spaced longer sides of said rectangular radial opening extend in the circumferential direction of said shaft.

22. A motor-operated rotary control valve as claimed in claim 21, further including a wedge-shaped notch extending contiguously from the vertex of said isosceles triangular orifice, said wedge-shaped notch having a depth smaller than the thickness of said one hollow cylindrical end portion of said shaft and progressively decreasing in a direction away from the vertex of said isosceles triangular orifice.

23. A motor-operated rotary control valve as claimed in claim 22, wherein an extent of said isosceles triangular orifice in the axial direction of said shaft is slightly smaller than the length of shorter sides of said rectangular radial opening, and a combined length of said isosceles triangular orifice and said wedge-shaped notch in the circumferential direction of said shaft is slightly larger than the length of said longer sides of said rectangular radial opening.

24. A motor-operated rotary control valve as claimed in claim 11, further including means engageable with said shaft for limiting angular movement of said shaft within a fixed range.

25. A motor-operated rotary control valve as claimed in claim 24, wherein said shaft is rotatably supported by said housing and has at least one prong projecting from an end face of said shaft, said limiting means comprising a stopper mounted in said housing and having a recess movably receiving therein said prong, said recess extending arcuately about the axis of said shaft through said fixed angular range.

* * * * *